US007490381B1

(12) United States Patent
Franzino

(10) Patent No.: US 7,490,381 B1
(45) Date of Patent: Feb. 17, 2009

(54) TUBE SCRAPER

(75) Inventor: Joseph J Franzino, Redding, CT (US)

(73) Assignee: Goodway Technologies Corporation, Stamford, CT (US)

( * ) Notice: Subject to any disclaimer, the term of this patent is extended or adjusted under 35 U.S.C. 154(b) by 43 days.

(21) Appl. No.: 11/500,056

(22) Filed: Aug. 7, 2006

(51) Int. Cl.
*B08B 9/055* (2006.01)
*B08B 9/04* (2006.01)
*F16L 55/26* (2006.01)

(52) U.S. Cl. .................................. 15/104.061
(58) Field of Classification Search ............ 15/104.061, 15/104.18, 104.05, 3.5
See application file for complete search history.

(56) References Cited

U.S. PATENT DOCUMENTS

| 488,842 | A | * | 12/1892 | Shultz | 15/104.17 |
| 507,421 | A | * | 10/1893 | Dean | 15/104.12 |
| 1,180,485 | A | * | 4/1916 | French | 15/104.07 |
| 1,814,752 | A | * | 7/1931 | Griffin | 15/104.061 |
| 2,317,542 | A | * | 4/1943 | Lincoln | 15/104.061 |
| 2,636,202 | A | * | 4/1953 | Hinzman | 15/104.061 |
| 3,047,895 | A | * | 8/1962 | Ver Nooy | 15/104.061 |
| 3,619,844 | A | * | 11/1971 | Collins et al. | 15/104.061 |
| 4,034,807 | A | * | 7/1977 | Prince et al. | 166/170 |
| 6,581,235 | B1 | * | 6/2003 | Stocco | 15/104.061 |

* cited by examiner

*Primary Examiner*—David B Thomas
(74) *Attorney, Agent, or Firm*—Patrick J. Walsh

(57) ABSTRACT

A tube scraper for removing deposits from the interior surface of heat exchange tubes, the scraper being fitted with a set of diverging scraper blade arms mounted on an arbor in nested relationship such that scraper blades have overlapping scraping edges.

4 Claims, 7 Drawing Sheets

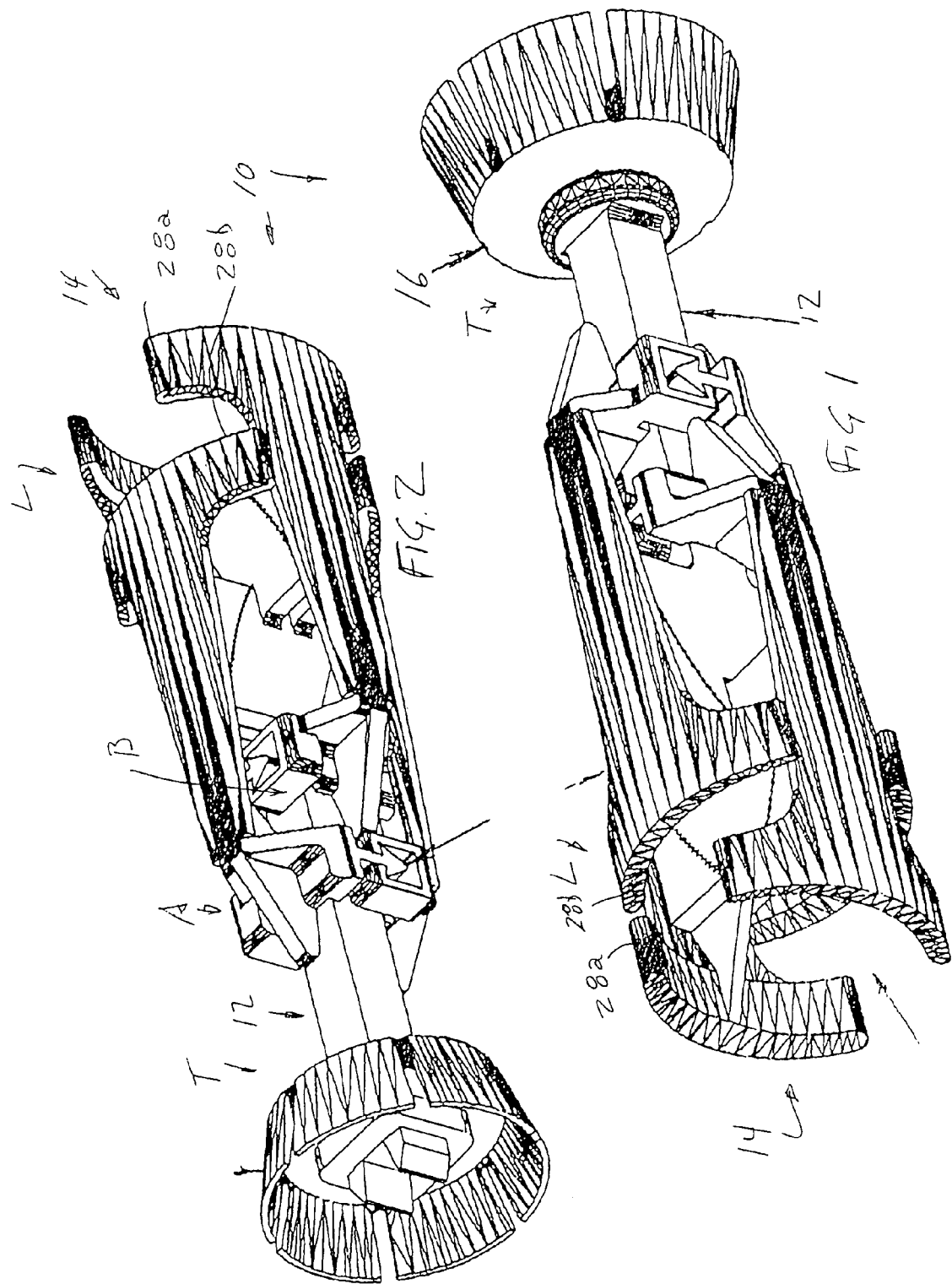

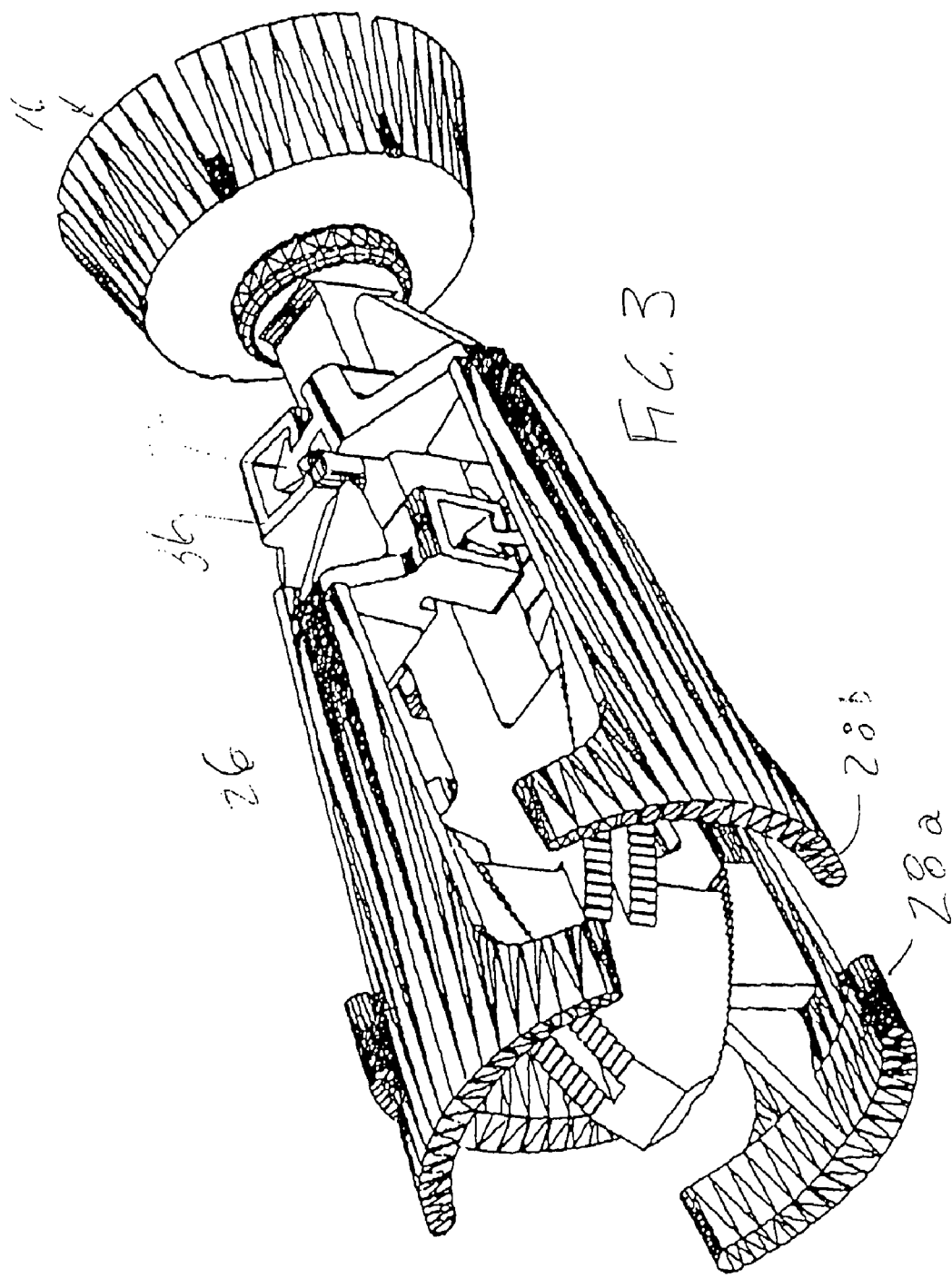

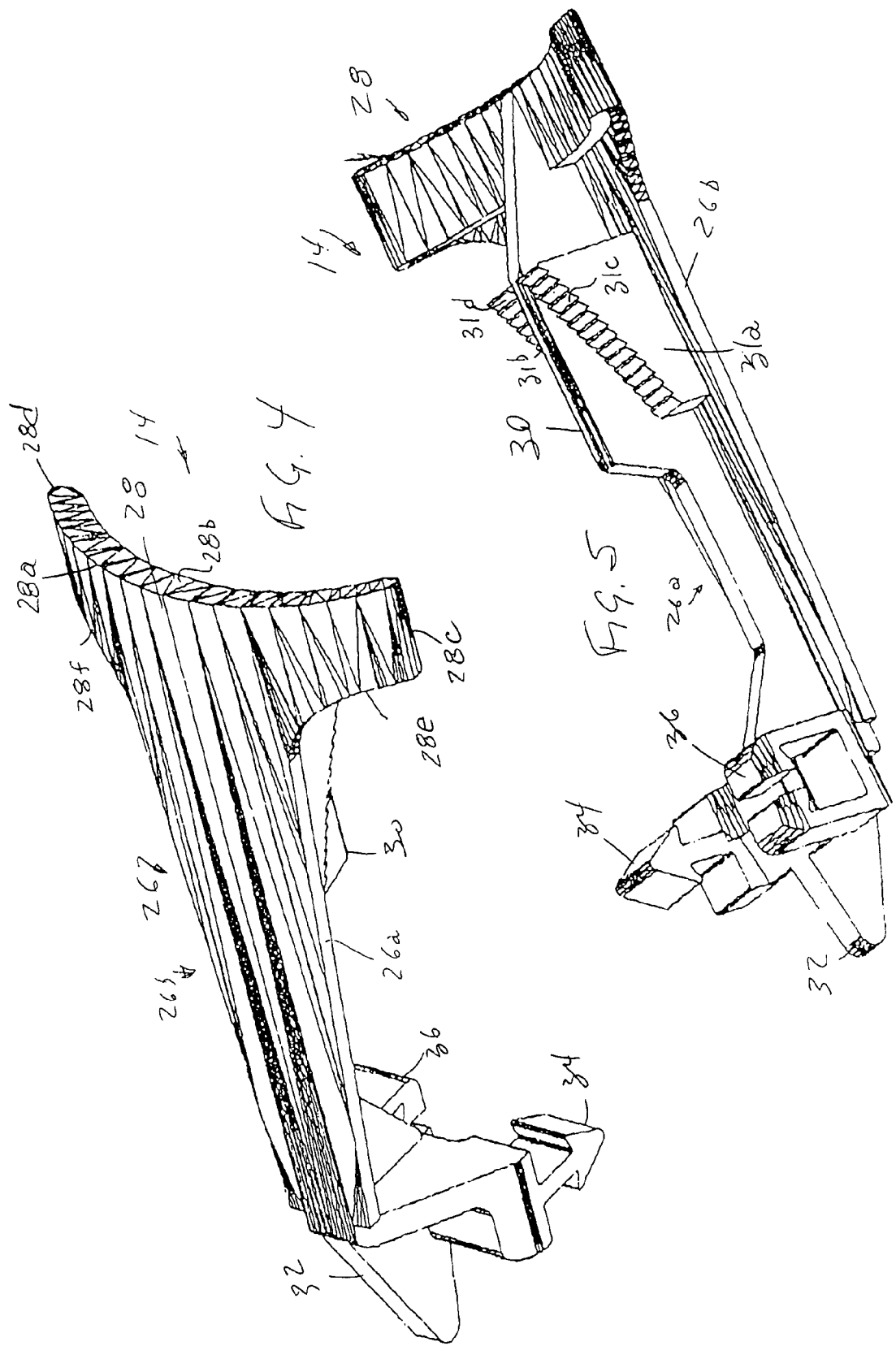

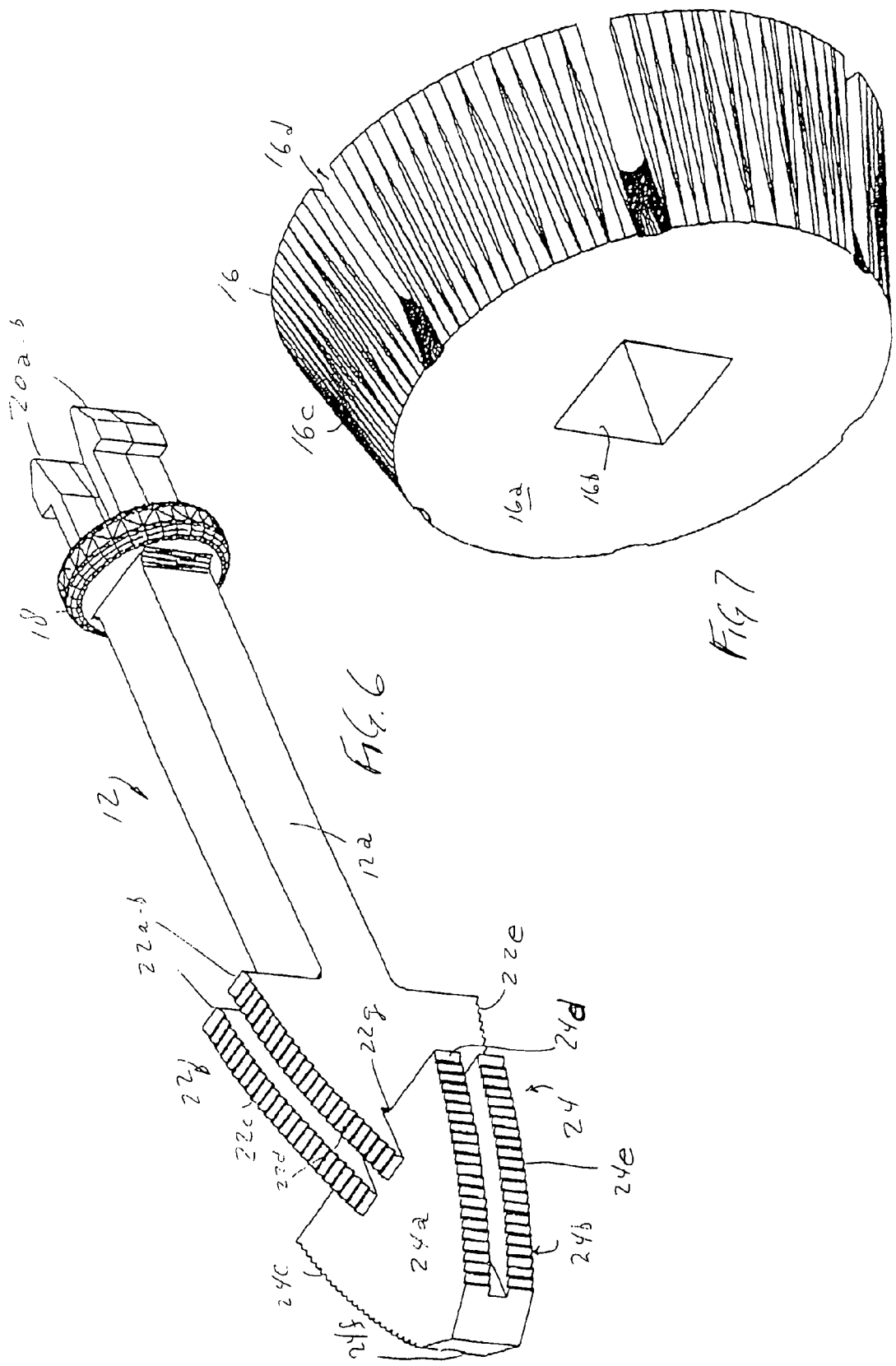

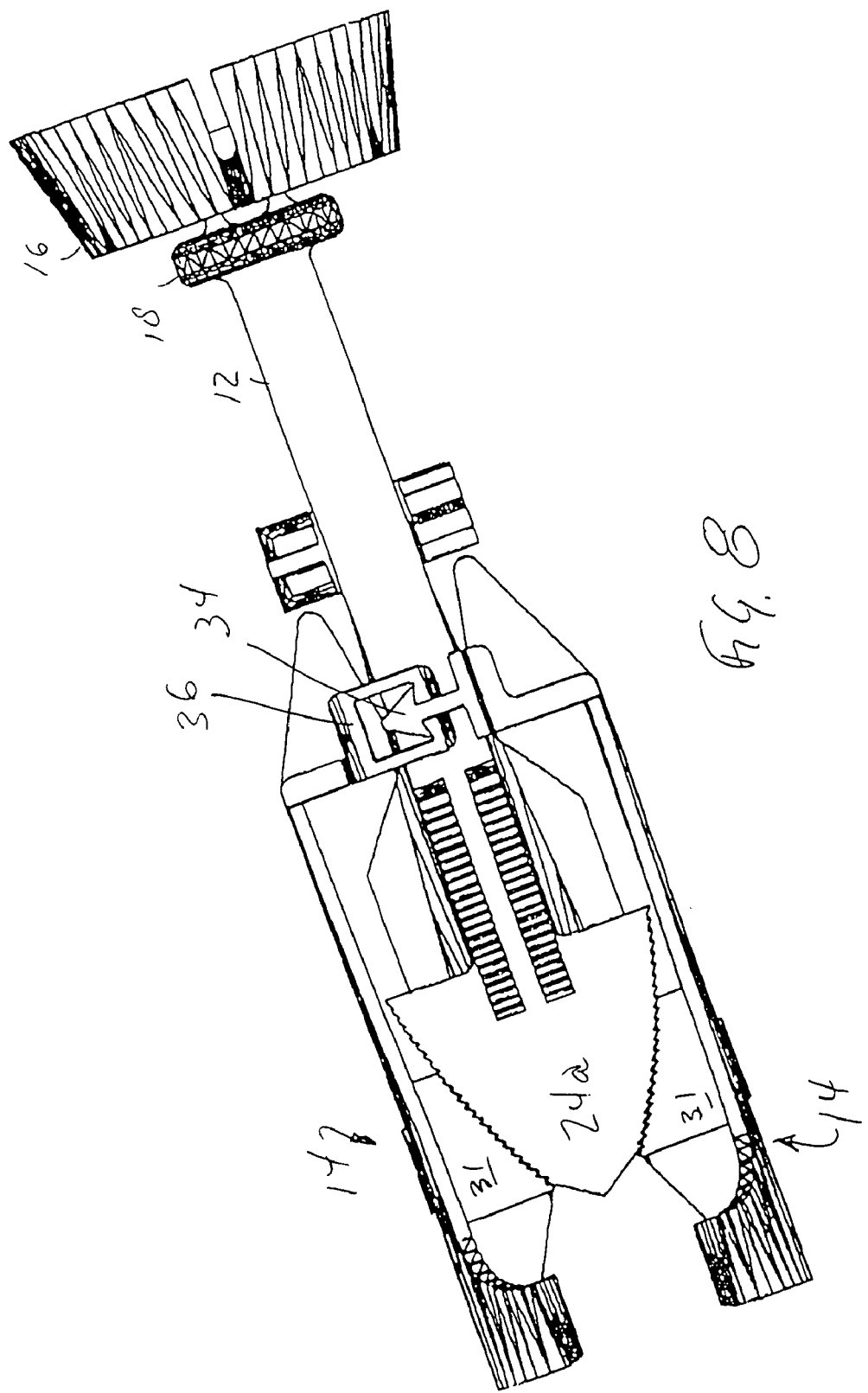

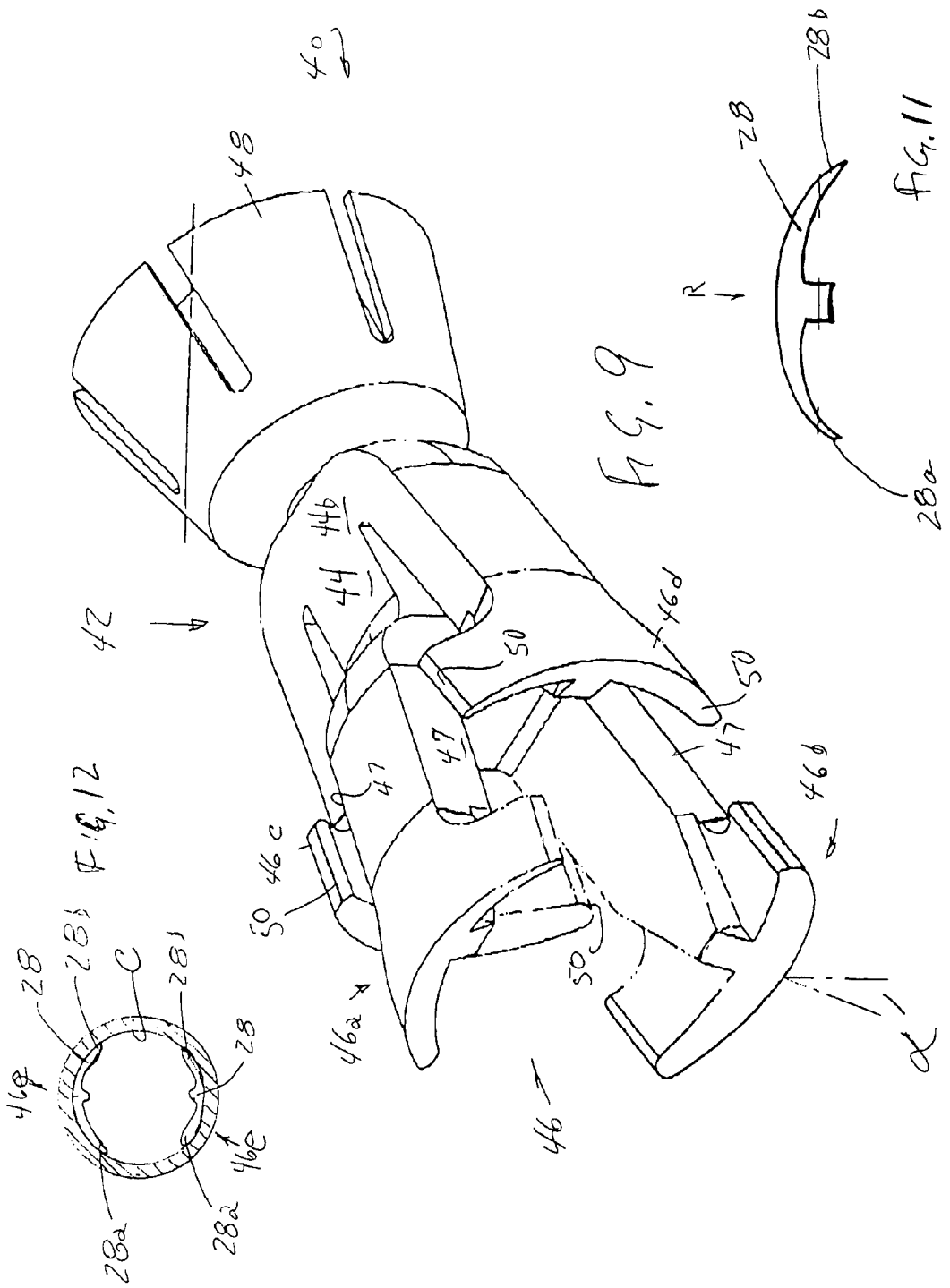

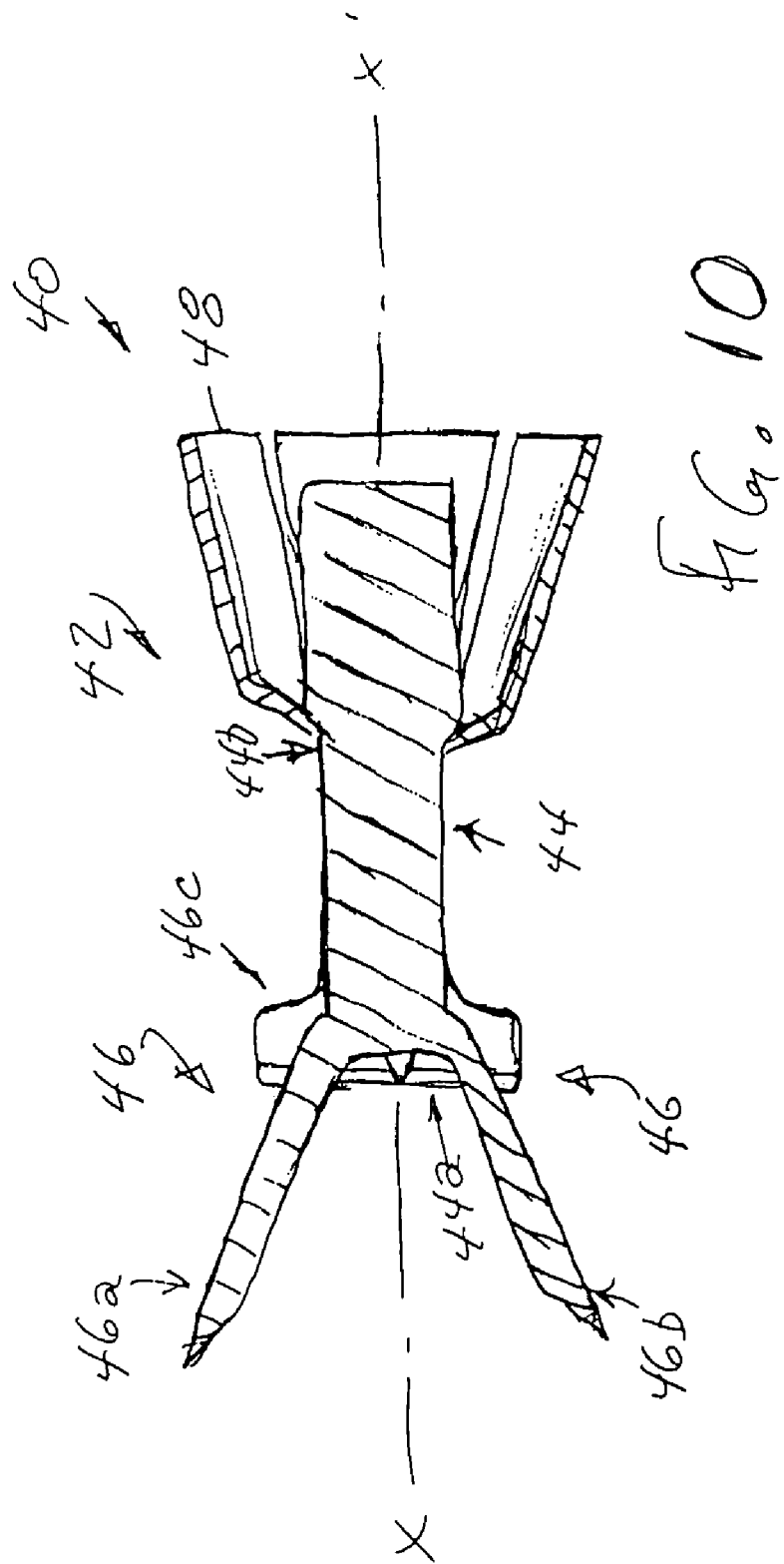

TUBE SCRAPER

BACKGROUND OF THE INVENTION

This invention relates to and provides a tube scraper for cleaning the interior surface of heat exchanger tubes such as boiler tubes and condenser tubes.

In normal operation, hard deposits such as rust and scale containing calcium, and soft deposits including slime and loose dirt build up on the interior surface of heat exchanger tubes that diminishes thermal efficiency and restricts fluid flow through the tubes. To maintain thermal efficiency and design flow in operation of the heat exchanger, it is necessary to remove such deposits.

These deposits are removed by mechanical scraping using a projectile driven through the tube by pressurized media including air, water, steam, or other gas. The pressure media acts on a projectile seal or piston for propelling the projectile through a tube. The projectile is fitted with scrapers engaging the tube interior wall for removing deposits as the projectile transits the tube. Preferably, the projectile pushes removed deposits ahead through the tube so both projectile and deposits are ejected from the far end of the tube.

The chief objective of the present invention is to provide an improved scraper for removing hard deposits from the interior surface of heat exchanger tubes.

SUMMARY OF THE INVENTION

The present invention provides a tube scraper having a set of scraper blades for engagement with a tube interior wall and having a piston sealing the scraper against the tube wall for pneumatically or hydraulically propelling the scraper through the tube. The scraper has a longitudinal axis (coincident with tube axis) and a plurality of radially moveable scraper blade arms affixed at one end to the piston end of the scraper body. The other end of each scraper blade arm has a scraping edge extending circumferentially of the axis for scraping engagement with a tube interior surface. The plurality of scraper edges extend circumferentially of the interior tube surface, with the scraping edge of each blade lying in an overlapping pattern with the scraping edges of adjacent blades.

In one embodiment of the invention, the tube scraper comprises scraper body in the form of an elongate arbor (defining a longitudinal axis) on which a set of scraper blades is mounted, and on which the propelling piston is mounted. The elongate arbor at its trailing end receives the propelling piston abutting a thrust bearing. The piston and thrust bearing receive the pneumatic or hydraulic driving force applied to the scraper in cleaning a tube. At its leading end the arbor has first and second inclined or wedge-like ratcheting surfaces positioned about the arbor for the purpose of holding the scraper blades in position against a tube interior surface. The first ratcheting surfaces are nominally in a vertical orientation with respect to the arbor axis, and the second ratcheting surfaces nominally in a horizontal orientation. The set of scraper blades are mounted on the arbor as interlocking pairs for movement along the arbor axis. A first pair of interlocking blades are mounted vertically of the arbor and cooperate with the first ratcheting surfaces, and a second pair of blades are mounted horizontally of the arbor for cooperation with the second ratcheting surfaces. The scraper blade arms have ratcheted surfaces engaging the arbor ratchet surfaces, so that, as the scraper passes through a tube with the blade arms encountering resistance at the tube interior surface so as to set-back the blades, the engaging blade and arbor ratcheting surfaces cooperate to force the blade edges radially outward keeping them in scraping engagement with the tube wall as the scraper is propelled through the tube. The result is a scraper having an internal dynamic mechanism for increased effectiveness of the scraper in removing hard deposits from a tube interior wall, and having an overlapping blade scrape pattern to ensure scraping of the entire interior circumference of the tube interior wall.

The first and second pairs of interlocking scraper blades are mounted at separate locations on the arbor with one pair being located forward and the other to the rear. Such forward and rear location of the blades allows for each blade in a four blade configuration to cover a circumferential arc of a tube interior surface greater than 90°. In this way, the cooperating blade pairs scrape a tube interior surface in an overlapping pattern for effective scraping of the tube interior.

In a preferred embodiment of the invention, the tube scraper comprises scraper body in the form of a scraper base on which a set of scraper blades is mounted, and on which the propelling piston is mounted. The scraper base at its trailing end receives the propelling piston. The piston abuts the scraper base and receives the pneumatic or hydraulic driving force applied to the scraper along the scraper longitudinal axis for cleaning a tube. A set of scraper blades are formed integral with the scraper as cooperating pairs being fixed with respect to the arbor axis. A first pair of interlocking blades are positioned vertically of the scraper base, and a second pair of blades are mounted horizontally. The scraper blade arms are mounted in canterlever on the scraper base and project in a diverging pattern from the base, so that, as the scraper passes through a tube with the blade arms encountering resistance at the tube interior surface so as to set-back the blades, the blades edges tend to move radially outward keeping them in scraping engagement with the tube wall as the scraper is propelled through the tube. The result is a scraper having a blade mechanism for increased effectiveness of the scraper in removing hard deposits from a tube interior wall, and having an overlapping blade scrape pattern to ensure scraping of the entire interior circumference of the tube interior wall.

The first and second pairs of interlocking scraper blades of the modified embodiment are mounted at separate locations on the arbor with one pair being located forward and the other to the rear. Such forward and rear location of the blades allows for each blade in a four blade configuration to cover a circumferential arc of a tube interior surface greater than 90°. In this way, the cooperating blade pairs scrape a tube interior surface in an overlapping pattern for effective scraping of the tube interior.

In each embodiment of the invention, the scraper blades are mounted at the leading edge of blade arms, and when viewed along the scraper axis, comprise arcuate blades tapering from the blade center toward blade tips to ensure that the blade tips are forced outward toward the tube wall for effective tube scraping over the full blade arc. An angle on the blade edge front face detours deposits away from the tube wall into a water or air stream accompanying the moving scraper.

The tube scrapers are manually inserted into a tube and propelled through the tube. Upon hitting a deposit, the blades are setback and are forced by the scraper piston against the tube wall maintaining firm contact.

An important aspect of the invention is that the tapered scraper blades conform to the inside diameter of all tube sizes within a specified range whereby a few scraper sizes cover many tube sizes.

Specific examples are included in the following description for purposes of clarity, but various details can be changed within the scope of the present invention.

OBJECTS OF THE INVENTION

An object of the invention is to provide a tube scraper for removing hard deposits from heat exchanger tubes.

Another object of the invention is to provide a tube scraper with scraper blades that "dig-into" and remove deposits encountered on tube walls Another object of the invention is to provide a tube scraper with a set of blades defining an overlapping cleaning pattern on a tube interior wall.

Another object of the invention is to provide a tube scraper having tapering, arcuate blades defining blades tips the remain in engagement with tube walls.

Another object of the invention is to provide for a tube scraper suitable for repeated usage in tube cleaning.

Another object of the invention is to provide a tube scraper with blades that conform to the interior surfaces of heat exchanger tubes for different tube inside diameters.

Other and further objects of the invention will become apparent with an understanding of the following detailed description of the invention or upon employment of the invention.

BRIEF DESCRIPTION OF THE DRAWING

Embodiments of the invention have been chosen for detailed description to enable those having ordinary skill in the art to which the invention appertains to readily understand how to construct and use the invention and is shown in the accompanying drawing in which:

FIG. 1 is a leading end perspective view of an embodiment of tube scraper according to the invention.

FIG. 2 is trailing end perspective view of the tube scraper of FIG. 1.

FIG. 3 is perspective view of the tube scraper of FIG. 2 showing arbor forward and blades ratcheted outward.

FIG. 4 is a upper side perspective view of a scraper blade arm for the scraper of FIG. 1.

FIG. 5 is a under side perspective view of a scraper blade arm for the scraper of FIG. 1.

FIG. 6 is a perspective view of an arbor for the scraper of FIG. 1.

FIG. 7 is a perspective view of a piston for the scraper of FIG. 1.

FIG. 8 is a plan view of a sub-assembly of the scraper of FIG. 1 with arbor, piston and an interlocked pair of blades fitted to the arbor.

FIG. 9 is a leading end perspective view of a preferred embodiment of tube scraper according to the invention.

FIG. 10 is a longitudinal section view of the scraper of FIG. 9.

FIG. 11 is a detail view of the leading edge of a scraper blade showing its tapered contour.

FIG. 12 is a section view of a tube interior showing scraper blades conforming to the tube interior circumference.

DETAILED DESCRIPTION OF THE PREFERRED EMBODIMENT

Referring to FIGS. 1-8 of the drawing, the present invention comprises a tube scraper 10 having an elongate arbor 12, set of scraper blade arms 14 and a piston 16 sealing the scraper against a tube wall for pneumatically or hydraulically propelling the scraper through the tube.

As shown in FIGS. 1-6 and 8 the arbor defines a longitudinal axis of the scraper. As best shown in FIG. 6, the arbor 12 includes a central beam 12a of rectangular, preferably square cross section on which a set of scraper blades is mounted. A thrust bearing 18 encircles the trailing end of the beam, and a set of spring fingers 20a-b extend rearward of the beam for mounting a propelling piston 16 (FIGS. 1-6). The piston and thrust bearing receive the pneumatic or hydraulic driving force applied to the scraper in cleaning a tube.

At its leading end the arbor has first 22 and second 24 inclined or converging ratcheting surfaces positioned about the arbor for the purpose of holding the set of scraper blades in position against a tube interior surface. The first 22 ratcheting surfaces are nominally in a vertical orientation with respect to the arbor axis and are defined by triangular plates 22a-b formed integral with the arbor beam. Converging surfaces 22c-f on each plate are ratcheted. The second ratcheting surfaces 24 are nominally in a horizontal orientation and are defined by triangular plates 24a-b projecting from a notch 22g in first triangular plates. Converging surfaces 24c-f on each second triangular plate are ratcheted.

The piston 16 shown in FIG. 7, includes a base 16a with central opening 16b for fitting the piston onto the spring fingers 20a-b as best shown in FIGS. 2 and 6. The piston further includes a flared skirt 16c diverging in the trailing direction of the scraper for providing an hydraulic or pneumatic seal against a tube interior wall. The skirt includes a set of passages 16d for passing a portion of propelling fluid ahead of the scraper as an aid in washing or blowing removed deposits out of a tube.

The scraper blade arms 14 are shown in FIGS. 4 and 5 and comprise a curved outer wall plate 26 with diverging forwardly extending side edges 26a-b terminating in and defining a forwardly projecting scraper blade 28. Scraper blade arms comprise an elongate plate with lateral curvature about the scraper axis conforming to tube wall interior. A scraper blade 28 is situated at the leading end of the blade arm and is defined by arcuate blade edge 28a, beveled front face 28b, blade tip edges 28c-d, and by rear edges 28e-f extending inward toward the center of the blade arm. The rear edges of the blade and the rearwardly converging side edges 26a-b of the blade arm define recesses to facilitate a nested blade arm arrangement in a manner described more particularly below.

The underside of the blade arm includes a central support ridge 30 normal to the outer wall and extending from the underside of the blade 28 to a lobe 32 projecting rearwardly from the blade arm. A pair of spaced inclined plates 31a-b with ratchet surfaces 31c-d are affixed to the underside of the blade arm on opposite sides of ridge 30. As pointed out in detail below, blade arm ratchets 31c-d cooperate with arbor ratchets described above.

Toward the trailing end of the outer wall there are on opposite sides of the ridge a prong 34 and receptacle 36 for assembling a pair of blade arms onto the arbor beam as best shown in FIG. 8. Prong 34 of one blade arm of a pair is secured into receptacle 36 of the other blade arm of the pair while on the far side of arbor beam and out of view, prong of the other blade arm of the pair is received in the receptacle of the one arm.

The set of scraper blades are mounted at separate locations A-B (FIG. 2) on the arbor as nested interlocking pairs for movement along the arbor axis. The nested arrangement appears in FIGS. 1-3 wherein the vertical and horizontal pairs are positioned, respectively, toward the trailing end T and the leading end L of the arbor beam. By this nested mounting, adjacent blade tips 28a-b travel in paths that overlap thereby providing an overlapping scraping pattern along tube interior walls allowing for each blade in a four blade configuration to cover a circumferential arc of a tube interior surface greater than 90°.

As shown in FIG. 3, the first pair of interlocking blades are mounted vertically of the arbor and cooperate with the first ratcheting surfaces, and the second pair of blades are mounted horizontally of the arbor for cooperation with the second ratcheting surfaces. The scraper blade arms have ratcheted surfaces engaging the arbor ratchet surfaces, so that, as the scraper passes through a tube with the blade arms encountering resistance at the tube interior surface so as to set-back the blades, the engaging blade and arbor ratcheting surfaces cooperate to force the blade edges radially outward keeping them in scraping engagement with the tube wall as the scraper is propelled through the tube. The result is a scraper having an internal dynamic mechanism for increased effectiveness of the scraper in removing hard deposits from a tube interior wall, and having an overlapping blade scrape pattern to ensure scraping of the entire interior cirumference of the tube interior wall.

In a preferred embodiment of the invention shown in FIGS. 9 and 10, the tube scraper 40 comprises scraper body 42 in the form of a scraper arbor 44 on which a set of scraper blade arms 46 is mounted in a nested arrangement at 90° intervals about the body, and on which the propelling piston 48 is mounted. The scraper arbor at its trailing end receives the propelling piston. The piston is integral with the scraper arbor and receives the pneumatic or hydraulic driving force applied to the scraper along the scraper longitudinal axis for cleaning a tube.

The set of scraper blade arms 46 are formed integral with the scraper arbor as cooperating pairs being fixed with respect to the scraper axis x-x'. A first pair of cooperating scraper blades 46a-b are positioned vertically of the scraper arbor, and a second pair 46c-d of blades are mounted horizontally. The scraper blade arms 46 are mounted in canterlever on the scraper arbor and project in a diverging pattern from the arbor, so that, as the scraper passes through a tube with the blade arms encountering resistance at the tube interior surface so as to set-back the blades, the blades edges tend to move radially outward keeping them in scraping engagement with the tube wall as the scraper is propelled through the tube. The angle of divergence of the blade arms is selected to permit insertion of the scraper blades into a tube end with a manual squeeze of the blades and to have the blade leading edge dig into tube deposits. The result is a scraper having a blade mechanism for increased effectiveness of the scraper in removing hard deposits from a tube interior wall, and having an overlapping blade scrape pattern to ensure scraping of the entire interior circumference of the tube interior wall.

The scraper blade arms 46 of the preferred embodiment each comprise an elongate plate with lateral curvature about the scraper axis conforming to tube wall interior. A scraper blade 46a-d is situated at the forward end of the blade arm and is defined by arcuate blade edge 46e, beveled front face 46f having angle α, blade tip edges 46g-h, and by rear edges 46i-j extending inward toward the center of the blade arm. The rear edges of the blade and the side edges of the blade arm define a recess 47 to facilitate a nested blade arm arrangement as described.

The first and second pairs of interlocking scraper blade arms of the preferred embodiment are mounted at separate locations on the scraper arbor with one pair 46a-b being spaced at the forward end 44a (FIG. 10) and the other pair 46c-d at the rear 44b of the arbor. Such forward and rear location of the blade arms allows for each blade in a four blade configuration to cover a circumferential arc of a tube interior surface greater than 90°. As shown in FIG. 9, the first pair of blade arms 46 is recessed 47 at its midsection so as to accommodate the tips 50 of the second pair 46c-d of blades. In this way, the cooperating blade pairs scrape a tube interior surface in an overlapping pattern for effective scraping of the tube interior.

In each embodiment of the invention, the scraper blades are mounted at the leading edge of blade arms, and when viewed along the scraper axis, comprise arcuate blades tapering from the blade center toward blade tips to ensure that the blade tips are forced outward toward the tube wall for effective tube scraping over the full blade arc. As shown in FIG. 11 illustrating a frontal contour of a blade, the blade 28 tapers from a central or ridge point R toward opposite tips 28a-b of the blade with the tip thickness being approximately two-thirds of the ridge point thickness. For example, the ridge thickness may measure 0.090" and tip 0.060".

A front-to-back angle α (FIG. 9) on the blade edge front face deflects deposits away from the tube wall into a water or air stream accompanying the moving scraper.

An important point is that the tapered scraper blades conform to all tube sizes within a specified range reducing the required number of tools and inventory. The set of scraper blade arms are radially flexible with respect to scraper axis so that a scraper conforms to all tube sizes within a specified range. Moreover, as shown in FIG. 12, the blades themselves are laterally flexible so that the leading edge 46e of each blade with blade tips 28a-b conforms to the circumference C of tube interior walls within the specified range. The invention deals with tube sizes in the range of ½-1" with wall thicknesses specified as a gage in the range of 16-22 BWG (Birmingham Wire Gage). Five tube inside diameters with 7 different gages yields 35 individual tools where only five scrapers according to the invention can cover the same 35 different tube inside diameters.

| | CHART TUBE I.D'S | | | | | | |
|---|---|---|---|---|---|---|---|
| Tube O.D. (in) | Gage (BWG)-Wall Thickness | | | | | | |
| & Scraper Size | 16 | 17 | 18 | 19 | 20 | 21 | 22 |
| ½ | 0.370 | 0.384 | 0.402 | 0.416 | 0.430 | 0.436 | 0.444 |
| ⅝ | 0.495 | 0.509 | 0.527 | 0.541 | 0.555 | 0.561 | 0.569 |
| ¾ | 0.620 | 0.634 | 0.652 | 0.666 | 0.680 | 0.686 | 0.964 |
| ⅞ | 0.745 | 0.759 | 0.777 | 0.791 | 0.805 | 0.811 | 0.819 |
| 1" | 0.870 | 0.884 | 0.902 | 0.916 | 0.930 | 0.936 | 0.944 |

The tube scrapers are manually inserted into a tube and propelled through the tube. Upon hitting a deposit, the blades are setback and are forced by the scraper piston against the tube wall maintaining firm contact.

Various changes may be made to the structure embodying the principles of the invention. The foregoing embodiments are set forth in an illustrative and not in a limiting sense. The scope of the invention is defined by the claims appended hereto.

I claim:

1. A tube scraper comprising an arbor defining a longitudinal axis, a set of scraper blade arms being mounted on the arbor defining adjacent blades spaced about the axis, the blade arms are movably mounted on the arbor for movement along the scraper axis, each blade arm having recessed side edges extending forwardly of the one end and terminating in a forwardly projecting scraper blade, each scraper blade having a concave curvature for insertion into a tube, each blade having spaced lateral blade tips with respect to which the blade arm side edges are recessed, each blade further having a front face with leading edge extending across the blade from lateral tip to lateral tip for scraping deposits from a tube interior wall, the set of blade arms being positioned on the arbor so that the leading edges of the lateral blade tips of adjacent blades overlap to provide an overlapping blade scrape pattern for scraping the entire circumference of a tube interior wall, the arbor and each blade arm are provided with cooperating ratcheting surfaces for driving the blade arms radially outward when the blade arms encounter a tube wall deposit, and a piston fitted to the arbor for propelling the scraper through a tube.

2. A tube scraper comprising an arbor defining a longitudinal axis, a set of scraper blade arms being mounted at one end to the arbor defining adjacent blades spaced about the axis, each blade arm having recessed side edges extending forwardly of the one end and terminating in a forwardly projecting scraper blade, each scraper blade having a concave curvature for insertion into a tube, each blade having spaced lateral blade tips with respect to which the blade arm side edges are recessed, each blade further having a front face with leading edge extending across the blade from lateral tip to lateral tip for scraping deposits from a tube interior wall, each blade has a bevelled front face, and in which the blade is tapered from its central portion to its blade tips, the set of blade arms being positioned on the arbor so that the leading edges of the lateral blade tips of adjacent blades overlap, the blade arm set including a first pair mounted at a first location on the arbor, a second pair mounted at a second location forward of the first location so that the blade arm recesses of the second pair accommodate in nested relation the blade tips of the first pair of blade arms, and a piston fitted to the arbor for propelling the scraper through a tube.

3. A tube scraper comprising an arbor defining a longitudinal axis, a set of scraper blade arms being mounted on the arbor defining blades spaced about the axis, each blade arm having recessed side edges extending forwardly of the one end and terminating in a forwardly projecting scraper blade, each scraper blade having a concave curvature for insertion into a tube, each blade having spaced lateral blade tips with respect to which the blade arm side edges are recessed, each blade further having a front face with leading edge extending across the blade from lateral tip to lateral tip for scraping deposits from a tube interior wall, the set comprising a first pair of cooperating scraper blades positioned vertically of the scraper arbor and a second pair of cooperating scraper blades positioned horizontally of the scraper arbor, the first and second pairs positioned in nested relation to each other wherein one of said pairs is positioned toward the leading end of the scraper arbor, and the other of said pairs is positioned toward the trailing end of the scraper arbor with blade tips accommodated within the recessed side edges of the blade arms of the one of said pairs thereby to provide an overlapping blade scrape pattern for scraping the entire circumference of a tube interior wall, the set of scraper blade arms being radially flexible with respect to scraper axis, the scraper blades being laterally flexible by reason of being tapered from their central portion to blade tips along their leading edge, each blade engaging and scraping a tube inner surface with full leading edge, so that by reason of being laterally flexible the blades of a tube scraper of given size scrapes with full leading edge all tube sizes within a specified range, and a piston fitted to the arbor for propelling the scraper through a tube.

4. A tube scraper as defined in claim 3 in which arbor, blade arms, blades and piston are formed integral.

* * * * *